United States Patent [19]
Priola et al.

[11] 3,853,829
[45] Dec. 10, 1974

[54] COPOLYMERS OF VINYL ETHERS AND CYCLIC POLYENES CONTAINING A SYSTEM OF CONJUGATED DOUBLE BONDS AND PROCESS FOR THE PREPARATION THEREOF

[75] Inventors: Aldo Priola; Sebastiano Cesca; Giuseppe Ferraris, all of San Donato Milanese, Italy

[73] Assignee: Snam Progetti, S.p.A., San Donato, Milanese, Italy

[22] Filed: July 28, 1972

[21] Appl. No.: 275,935

[30] Foreign Application Priority Data
July 31, 1971 Italy .................................. 27015/71

[52] U.S. Cl. ........................ 260/88.1 R, 260/79.5 C
[51] Int. Cl. .............................................. C08f 15/02
[58] Field of Search ...................... 260/88.1 R, 93.1

[56] References Cited
UNITED STATES PATENTS
3,179,717  4/1965  Dufek et al. ......................... 260/886

Primary Examiner—Harry Wong, Jr.
Attorney, Agent, or Firm—Ralph M. Watson

[57] ABSTRACT

Vulcanizable, elastomeric copolymers of vinyl ethers and cyclic polyenes, which have a molecular weight above 50,000 and a vinyl ether content in excess of 80%, are prepared by reacting an alkyl vinyl ether such as vinyl isobutyl ether with a conjugated cyclic diolefin wherein both double bonds are endocyclic or with a cyclic diolefin or triolefin having a system of conjugated double bonds, at least one of which is endocyclic, in the presence of a Friedel-Crafts catalyst and a solvent of low or high polarity; the nature and state of the obtained copolymer being controllable by the respective concentrations of the reactants and the polarity of the reaction medium.

7 Claims, No Drawings

COPOLYMERS OF VINYL ETHERS AND CYCLIC POLYENES CONTAINING A SYSTEM OF CONJUGATED DOUBLE BONDS AND PROCESS FOR THE PREPARATION THEREOF

The present invention relates to novel copolymers constituted by vinyl ethers and cyclic polyenes containing a system of conjugated double bonds and to the process for the preparation thereof.

More particularly the present invention relates to high molecular weight copolymers, which have also a large amount of vinyl ethers and can be used as unsaturated elastomers which are to be vulcanized.

Vinyl ether and cyclic diene copolymers are known, having a large diene content, up to 90% and never lower than 30%.

They generally are oligomers or anyhow copolymers having very low molecular weight, whose peculiar properties and composition make the utilization thereof difficult and problematical.

In fact their nature as sticky products, requiring the use of oxygen or air in order to get consistency, places them in the paint and drying oil class. Namely they have a molecular weight generally lower than 10,000 and, as such, they cannot be used to produce elastomers, which require starting polymer chains having a remarkable length and molecular weights higher than 50,000.

Moreover the known copolymers have a very high reactivity, above all towards oxygen, which is caused by the large unsaturation amounts and causes a high degradation of the product itself.

We have now found it is possible to obtain copolymers constituted by vinyl ethers and polyenes containing at least two conjugated double bonds at molecular weights higher than 50,000, having a large vinyl ether content, higher than 80%: this fact gives our polymers good properties during the processing phase and a good stability; moreover they can be subjected to vulcanization processes for producing elastomers.

Vinyl ethers which can be usefully employed according to the inventive copolymerization process are selected from the alkyl vinyl ethers containing aliphatic, cycloaliphatic, aromatic hydrocarbon radicals and halogen derivatives thereof, at a carbon atom number ranging from 1 to 20, whilst the polyenes are selected from the conjugated cyclic diolefins wherein both the double bonds are endocyclic or from the cyclic diolefins or triolefins having a system of conjugated double bonds of which at least one is endocyclic.

Several polyene compounds employable according to the aforesaid process were claimed by the same Applicant in several patent applications and can be exemplified by the following compounds: cyclopentadiene, methyl-cyclopentadiene, 1-isopropylidene-dicyclopentadiene, dehydro-dicyclopentadiene, 1-isopropylidene-3a, 4, 7, 7a-tetrahydroindene and the like. The structure of some cited polyenes is hereinafter schematically reported.

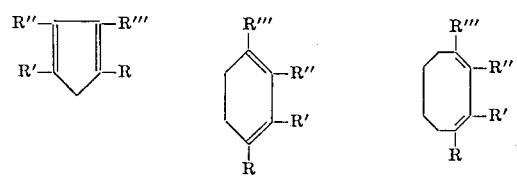

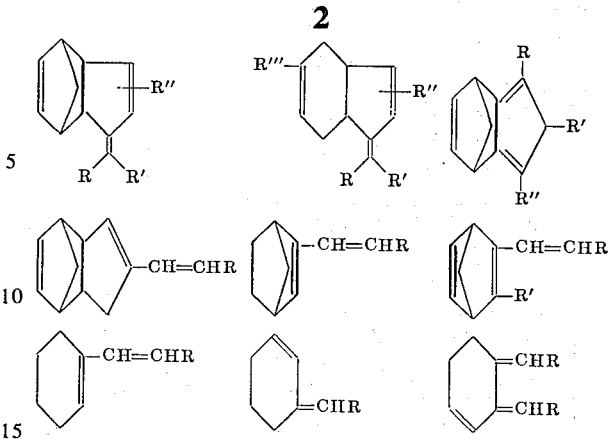

wherein R, R',R'' and R''' are hydrogen, or alkyl, aryl, cycloalkyl, alkenyl or cycloalkenyl radicals.

The copolymerization reaction proceeds in the presence of Friedel-Crafts catalysts as tin tetrachloride, aluminium trichloride, iron chloride, boron trifluoride, titanium tetrachloride and the like.

That reaction is carried out in the presence both of solvents having a low dielectric constant (<3 at room temperature) as, for instance, aliphatic, aromatic or cycloaliphatic hydrocarbons and of solvents having a high dielectric constant as, for instance, halogens containing hydrocarbons or mixtures of the same with some other ones having a higher polar character. And even the nature of the employed solvent is an interesting characteristic of the process according to the present invention.

We have found that, by using solvents having a low polarity ($\epsilon < 3$) it is possible to obtain copolymers which are partially crystalline, whilst if use is made of polar solvents ($\epsilon > 3$) the obtained products are completely amorphous. Furthermore the crystallinity decreases as the diene percentages entering the chain increase, and completely disappears at comonomer concentrations equal to 10–15% by moles.

Therefore it is clearly possible to control the nature and the state of the obtainable products by suitably changing the polymerization conditions and particularly the respective concentrations of the reactants and the polarity of the reaction medium.

The reaction temperature can range from $-100°C$ to $+100°C$, whilst it is advantageous to work at room pressure.

The above and other working characteristics will be more clearly pointed out by the following examples, by which we illustrate the invention without limiting the purposes thereof.

EXAMPLE 1

50 cc of $CH_2Cl_2$ were introduced into a 100 cc three necked flask provided with a mechanical stirrer and an input funnel, which was previously dried by flame under a dried nitrogen stream: then vinyl-isobutyl-ether and cyclopentadiene were introduced through a pipette: cyclopentadiene was freshly distilled and Kept at the temperature of $-80°C$. The apparatus was thermostated at $-78°C$; then 0.3 mmole of $BF_3.OEt_2$, dissolved in 5 cc of $CH_2Cl_2$, was slowly added under stirring and a light nitrogen pressure. A quick increase of the medium viscosity was noted. The reaction was protracted for 2 hours, then it was stopped by adding 1 cc of an ammonia diluted solution in methyl alcohol.

The polymer was recovered by coagulating it in methyl alcohol under a nitrogen atmosphere, again dissolved in $CH_2Cl_2$ and then dried for one night by means of the vacuum produced by a mechanical pump. The results of some tests carried out in $CH_2Cl_2$ are reported on table 1. The percentage of comonomer present in the obtained polymer was determined by titrating with $I_2$ solutions in $C\,Cl_4$ and by employing mercury acetate as catalyst: on samples containing higher comonomer amounts the determination was carried out by NMR.

The polymers were analyzed by X-ray examination: some of them resulted completely amorphous, whilst some others were crystalline.

Some samples were vulcanized according to the following recipe:

| | | |
|---|---|---|
| Polymers | 100 | parts |
| Stearic acid | 0.5 | parts |
| ZnO | 5 | parts |
| Sulphur | 2 | parts |
| 2-mercaptobenzothiazol | 1 | parts |
| Tetramethyl-tiuramedisulphide | 2 | parts |
| Phenyl-B-naphtylamine | 1 | parts |
| Vulcanization temperature | 145°C | |
| Vulcanization time | 2 | hours |

The determination of some mechanical properties carried out on vulcanized samples gave the results reported on the table 2.

The true copolymer nature of the obtained products was proved both by the X-ray analysis and by the differential thermal analysis (DTA) which showed a progressive increase of the vitreous transition temperature (Tg) as the diene amount of the polymer increased. Furthermore both IR and NMR analyses emphasized the presence of characteristic bands which could be attributed to structural unities deriving from the polymerization of cyclopentadiene. The observed bands are the following ones:

| | | |
|---|---|---|
| IR analysis: | 3040 cm$^{-1}$ | unsaturated -C-H stretching |
| | 1610 cm$^{-1}$ | C=C stretching |
| | 750 cm$^{-1}$ | out of plane deformation of the unsaturated -C-H bond. |
| NMR anlysis: | | signal at 5.7 ppm which was attributed to cyclopentene protons (TMS as internal standard). |

EXAMPLE 2

Vinyl-isobutyl-ether and methyl-cyclopentadiene were copolymerized in $CH_2Cl_2$ or toluene at the temperature of − 78°C according to the procedure of the preceding example: methyl-cyclopentadiene (a mixture of 2 and 3 methyl-derivatives) was distilled before being used and kept at −80°C. The results of the tests are reported on table 3 and show polymers were obtained at high diolefin percentage. The true copolymer nature of the obtained polymers was proved both by IR anlysis and by differential thermal analysis. Furthermore both IR and NMR analyses showed the presence of characteristic bands which could be attributed to structural unities deriving from the polymerization of methylcyclopentadiene. In fact NMR analysis showed a signal at 5.3 ppm which could be attributed to the cyclopentene proton. IR analysis showed the characteristics bands deriving from the polymerization of methyl-cyclopentadiene, at 3,030 cm$^{-1}$ and 1,670 cm$^{-1}$ and 820 cm$^{-1}$.

Vulcanization tests of some samples carried out in presence of sulphur pointed out modulus increases, which could be attributed to the vulcanization reaction itself.

EXAMPLE 3

The copolymerization of cyclopentadiene and vinylisobutylether was carried out in the same apparatus previously described by working in mixtures of different solvents, one of which was little polar and another one had a higher polarity. The results are reported in table 4. The copolymer character of the obtained product was emphasized by the RX and DTA analyses: The IR anlysis too showed the presence of structural unities deriving from the polymerization of cyclopentadiene.

EXAMPLE 4

By working according to the preceding examples some vinyl-ethers were reacted with cyclopentadiene in presence of various catalyst systems. The results are reported on table 5. The presence of cyclopentene unities in the copolymer was pointed out by the IR analysis, whereas the structure thereof was examined by the RX analysis.

EXAMPLE 5

50 cc of $CH_2Cl_2$ were put into the same aforesaid apparatus; then cc 5.3. (40 mmoles) of vinyl-isobutyl-ether and cc 5.3. (30 mmoles) of 1-isopropyliden-dicyclopentadiene were added.

The mixture was cooled at −78°C, then 0.3 mmole of $BF_3$ etherate was slowly added, under stirring, dissolved into 5 cc of $CH_2Cl_2$; the reaction was protracted for 90'-2.2 g of polymer were obtained (yield=24%) having $[\eta]$=0.75 dl/g.

The IR analysis of the polymer emphasized the presence of characteristic bands, which could be attributed to structural unities deriving from 1–4 polymerization of the conjugated diene system of the triene compound; particularly the band at 1,566 cm$^{-1}$ was seen, characteristic of the norbornene double bond. The NMR analysis of the copolymer showed the polymer contained a molar fraction equal to 9% as structural unities deriving from the polymerization of 1-isopropylidene-dicyclopentadiene. Vulcanization tests showed modulus increases which could be attributed to the presence of the unsaturated comonomer participating in cross-linking processes among the chains.

EXAMPLE 6

According to the same procedure of the preceding examples and by working in 50 cc of $CH_2Cl_2$, cc 4 of vinyl-2-chloro-ethyl ether (40 mmoles) were reacted with cc 0.5 (2.82 mmoles) of 1-isopropyliden-dicyclopentadiene at the temperature of −80°C. 0.5 mmole of Al Et $Cl_2$ was added, dissolved into 5 cc of $CH_2Cl_2$, and the reaction was protracted for 90'. 2.85 g of polymer were obtained (yield = 63.5%) having $[\eta]$ = 0.52 dl/g. The 1-isopropyliden-dicyclopentadiene content of the copolymer was 3% by moles: it was determined by an iodine titration.

EXAMPLE 7

50 cc of $CH_3Cl$ were condensed in a reactor provided with a lined input funnel; then 5 cc (mmoles 50) of vinyl-2-chloroethyl ether and 3 cc (mmoles 17) of 1-isopropylidene-dicyclopentadiene were introduced. 0.5 mole of $BF_3$ etherate dissolved into 5 cc of $CH_3Cl$ was slowly added: the reaction was protracted for 3 hours. 5.50 g of polymers were obtained (yield=69%) having $[\eta]=0.40$ dl/g. The 1-isopropyliden-dicyclopentadiene content was 14% by moles, it being determined by iodine titrations.

EXAMPLE 8

By working according to the procedure of the preceding examples in a 100 cc flask, 1.95 g (15 mmoles) of dehydro-dicyclopentadiene were reacted with 2.65 cc (20 mmoles) of vinyl-isobutyl-ether in 30 cc of toluene at $-80°C$: the catalyst consisted of 0.15 mmole of Ti Cl$_4$ dissolved into 5 cc of toluene. The reaction was protracted for 4 hours; after that a viscous solution was obtained from which were precipitated g 1.1 (yield = 27%) of polymer having $[\eta]=0.42$ dl/g. The IR analysis of the polymer showed the presence of characteristic bands which could be attributed to both monomers employed in the polymerization. Particularly there were the band characteristic of the norbornene double bond (at 1,533 cm$^{-1}$) and the one of the ether bond (1,100 cm$^{-1}$).

The composition of the copolymer was determined by the elementary analysis and was 27% moles with respect to dehydrodicyclopentadiene.

EXAMPLE 9

In the aforesaid apparatus and in presence of 50 cc of CH$_2$Cl$_2$ cc 5.3 (40 mmoles) of vinyl-isobutyl-ether were reacted with cc 5.10 (30 mmoles) of 1-isopropyliden-3a,4,7,7a-tetrahydroindene.

0.5 mmole of BF$_3$ etherate was slowly added at $-78°C$: the reaction was protracted for 2 hours. 2.0 g of polymer were obtained (yield = 22%) having $[\eta]=0.38$ dl/g. The IR analysis showed the presence of bands which could be attributed to structural unities deriving from the polymerization in 1–4 of the conjugated diene system of the triene compound; particularly the band at 1,625 cm$^{-1}$ was emphasized, characteristic of the cyclohexene double bond.

TABLE 1

Copolymerization of vinyl-isobutyl-ether with cyclopentadiene
Experimental conditions: T = $-78°C$; Catalyst, BF$_3$.OEt$_2$ (conc. = $6.10^{-3}$ mol/l); monomer = 0.8 mol/l

| Test N. | Solvent | Cyclopentadiene mol/l | Time h. | Yield % | $[\mu]^1$ (dl/g) | Composition[2] % | RX analysis |
|---|---|---|---|---|---|---|---|
| 1) | CH$_2$Cl$_2$ | 0.08 | 2 | 63 | 0.93 | 3.2 | amorphous product |
| 2) | CH$_2$Cl$_2$ | 0.16 | 2 | 60 | 0.70 | 5.8 | amorphous product |
| 3) | CH$_2$Cl$_2$ | 0.24 | 2 | 46 | 0.66 | 8.2 | amorphous product |
| 4) | CH$_2$Cl$_2$ | 0.40 | 2 | 29 | 0.55 | 16.5 | amorphous product |
| 5) | CH$_2$Cl$_2$ | 0.66 | 2 | 21 | 0.62 | 24.8[3] | amorphous product |
| 6) | Toluene | 0.16 | 0.1 | 77 | 2.33 | 2.3 | crystalline product |
| 7) | Toluene | 0.24 | 0.1 | 74 | 1.66 | 2.4 | crystalline product |
| 8) | Toluene | 0.44 | 0.1 | 70 | 1.54 | 3.3 | crystalline product |
| 9) | Toluene | 0.64 | 0.1 | 50 | 1.05 | 6.2 | crystalline product |

[1] Determined in toluene at 30°C
[2] Molar fraction of cyclopentadiene in the copolymer determined by an iodine titration
[3] Determined by NMR way

TABLE 2

Mechanical properties of vulcanized copolymers formed by vinyl-isobutyl-ether and cyclopentadiene

| Test N. | Elongation modulus at 300% (Kg/cm$^2$) | Ultimate tensile stress (Kg/cm$^2$) | Elongation at break % | Permanent set after break (%) |
|---|---|---|---|---|
| 2) | 23 | 60 | 440 | — |
| 5) | 26 | 62 | 445 | 17 |
| 6) | 35 | 77 | 520 | — |
| 7) | 32 | 73 | 440 | — |
| 8) | 48 | 101 | 415 | 19 |

TABLE 3

Copolymerization of vinyl-isobutyl-ether with methyl-cyclopentadiene
Experimental conditions: T = $-78°C$; Catalyst BF$_3$.OEt$_2$ ($6.10^{-3}$ mol/l); Monomer = 0.8 mol/l.

| Solvent | Methyl-cyclopentadiene mol/l | Time (h) | Yield | $[\mu]^1$ (dl/g) | Composition[2] | RX analysis |
|---|---|---|---|---|---|---|
| CH$_2$Cl$_2$ | 0.04 | 2.5 | 35 | — | 14.8 (19.7[3]) | Amorphous product |
| CH$_2$Cl$_2$ | 0.08 | 3 | 25 | 0.45 | 21.5 | Amorphous product |
| Toluene | 0.04 | 0.5 | 20 | 1.18 | 6.0 | Crystalline product |
| Toluene | 0.08 | 0.75 | 35 | — | 11.7 | Amorphous product (traces of crystallinity) |
| Toluene | 0.12 | 1 | 30 | 0.83 | 19.2 | Amorphous product |
| Toluene | 0.16 | 1.5 | 27 | 0.75 | 23.7 | Amorphous product |

[1] Determined in toluene at 30°C
[2] Molar fraction of methyl-cyclopentadiene in the copolymer determined by an iodine titration
[3] Determined by NMR way

TABLE 4

Copolymerization of vinyl-isobutyl-ether with cyclopentadiene carried out in various solvents
Experimental conditions: T = −78°C; catalyst, BF$_3$OEt$_2$ (6.10$^{-3}$ mol/l); Monomer 0.8 mol/l.

| Solvents | | | | Cyclopentadiene | Time | Yield | [μ] | Composition[2] | RX analysis |
| Type | %[1] | Type | %[1] | mol/l | (minutes) | (%) | (dl/g) | (%) | |
|---|---|---|---|---|---|---|---|---|---|
| Toluene | 50 | CH$_2$Cl$_2$ | 50 | 012 | 20 | 75 | 1.36 | 2.6 | Amorphous product |
| Toluene | 50 | CH$_2$Cl$_2$ | 50 | 0.20 | 20 | 43 | 1.16 | 4.0 | Amorphous product |
| Toluene | 50 | CH$_2$Cl$_2$ | 50 | 0.28 | 50 | 40 | 1.08 | 6.7 | Amorphous product |
| Toluene | 90 | C$_6$H$_5$NO$_2$ | 10 | 0.20 | 12 | 30 | 1.48 | 2.4 | Crystalline product |
| Toluene[3] | 80 | C$_6$H$_5$NO$_2$ | 20 | 0.20 | 5 | 66 | 1.36 | 2.9 | Amosphous product |
| Toluene | 90 | C$_6$H$_5$NO$_2$ | 10 | 0.26 | 30 | 30 | 1.26 | 2.9 | Crystalline product |

[1] % by volume
[2] Molar fraction of cyclopentadiene in the copolymer determined by an iodine titration
[3] T = −50°C

TABLE 5.—COPOLYMERIZATION OF VINYL-ETHERS CYCLOPENTADIENE IN VARIOUS EXPERIMENTAL CONDITIONS

| Solvent | Vinyl-ether | | Cyclopentadiene, mol/l.[1] | Catalyst | | T., °C. | Time (m.) | Yield (percent) | [η] (dl./g.) | Composition (percent) | RX, analysis |
| | Type | Conc. (mol/l.) | | Type | Conc. (mol/l.) | | | | | | |
|---|---|---|---|---|---|---|---|---|---|---|---|
| Toluene | Vinyl-isobutyl-ether | 0.8 | 0.16 | AlEt$_3$+TiCl$_4$ | 0.02+0.01 | −80 | 30 | 26 | 0.47 | 2.5 | |
| Do | do | 0.8 | 0.24 | AlEt$_3$+TiCl$_3$ | 0.02+0.01 | −80 | 90 | 25 | | 4.5 | |
| Do | do | 0.8 | 0.42 | AlEt$_3$+TiCl$_4$ | 0.02+0.01 | −80 | 140 | 19 | | 8.5 | |
| Do | do | 0.8 | 0.08 | PF$_5$ | 0.6.10$^{-3}$ | −60 | 2' | 94 | 0.57 | 5.4 | Crystalline product. |
| Do | do | 0.8 | 0.12 | PF$_5$ | 0.4.10$^{-3}$ | −60 | 5' | 79 | 0.55 | | Do. |
| n-Pentane | Vinyl-n.butyl-ether | 0.8 | 0.08 | Al$_2$(SO$_4$)$_3$·H$_2$SO$_4$ | ([2]) | +20 | 180' | 68 | 1.81 | 1.2 | Produce lightly crystalline. |
| Do | do | 0.8 | 0.12 | Al$_2$(SO$_4$)$_3$·H$_2$SO$_4$ | ([2]) | 0 | 17 h. | 63 | | 1.2 | Do. |
| Do | Vinyl-ethyl-ether | 1.0 | 0.05 | Al$_2$(SO$_4$)$_3$·H$_2$SO$_4$ | ([2]) | 0 | 75' | 98 | | 2.9 | |
| Do | do | 1.0 | 0.13 | Al$_2$(SO$_4$)$_3$·H$_2$SO$_4$ | ([2]) | 0 | 60' | 92 | 1.7 | 3.5 | |

[1] Molar fraction of cyclopentadiene determined by an iodine titration.
[2] Mosley catalyst: use was made of 10 mg. suspended in vaseline.

What we claim is:

1. A copolymer of vinyl-ethers wherein said vinyl-ethers are alkylvinyl-ethers containing hydrocarbon radicals of from 1 to 20 carbon atoms which are selected from the group consisting of aliphatic and the halogen derivatives thereof and a cyclic polyene selected from the group consisting of cyclopentadiene, methyl-cyclopentadiene, 1-isopropylidentetrahydroindene, dehydro-dicyclopentadiene and 1-isopropyliden-3a, 4, 7, 7a-tetrahydroindene having a vinyl-ethers content higher than 80% and a molecular weight higher than 50,000, said copolymer having been prepared in the presence of a Friedel-Crafts catalyst.

2. A process for preparing copolymers as defined in claim 1 comprising polymerizing said cyclic polyene with a vinyl-ether in presence of a Friedel-Crafts catalyst.

3. A process for preparing copolymers according to claim 2 characterized in that the reaction is carried out in presence of solvents having a low dielectric constant (ε>3) which are selected from the group consisting of aliphatic, aromatic and cycloaliphatic hydrocarbons.

4. A process for preparing copolymers according to claim 2 characterized in that the reaction is carried out in presence of solvents having a high dielectric constant (ε>3).

5. A process according to claim 2 characterized in that the reaction is carried out at temperatures ranging from −100° to +100°C.

6. A process according to claim 2 characterized in that the reaction is carried out at atmospheric pressure.

7. Vulcanized elastomers obtained from copolymers consisting of vinyl-ethers wherein said vinyl-ethers are alkylvinyl-ethers containing hydrocarbon radicals of from 1 to 20 carbon atoms which are selected from the group consisting of aliphatic and the halogen derivatives thereof and a cyclic polyene selected from the group consisting of cyclopentadiene, methyl-cyclopentadiene, 1-isopropylidentetrahydroindene, dehydro-dicyclopentadiene and 1-isopropyliden-3a, 4, 7, 7a-tetrahydroindene having a vinyl ether content higher than 80% and a molecular weight higher than 50,000, said copolymer having been prepared in the presence of a Friedel-Crafts catalyst.

* * * * *